United States Patent [19]

Gyugyi

[11] Patent Number: 4,538,220
[45] Date of Patent: Aug. 27, 1985

[54] ADJUSTABLE FREQUENCY AC MOTOR DRIVE USING AN UNRESTRICTED FREQUENCY CHANGER SYSTEM

[75] Inventor: Laszlo Gyugyi, Penn Hills Township, Allegheny County, Pa.

[73] Assignee: Westinghouse Electric Corp., Pittsburgh, Pa.

[21] Appl. No.: 548,546

[22] Filed: Nov. 3, 1983

[51] Int. Cl.³ ............................................ H02M 5/27
[52] U.S. Cl. ..................................... 363/161; 363/10; 363/164
[58] Field of Search .................. 363/8, 9, 10, 160, 164, 363/165; 318/808, 810, 811

[56] References Cited

U.S. PATENT DOCUMENTS 3,470,447 9/1969 Gyugyi et al. ........................ 363/10
3,493,838 2/1970 Gyugyi et al. ........................ 363/10

Primary Examiner—William H. Beha, Jr.
Assistant Examiner—Jeffrey Sterrett
Attorney, Agent, or Firm—C. M. Lorin

[57] ABSTRACT

In an unrestricted frequency changer (UFC) the control pulses are generated by the intersection of a reference ramp of controllable slope and frequency with a succession of timing ramps characterizing the succession of phase voltages at the input of the UFC, whereby by increasing the slope and exceeding the peaks of the timing waves the sinusoidal shape of the output becomes trapezoidal and by increased slope increasingly close to a square-shaped wave, thus maximizing the output voltage at high frequency of operation.

6 Claims, 17 Drawing Figures

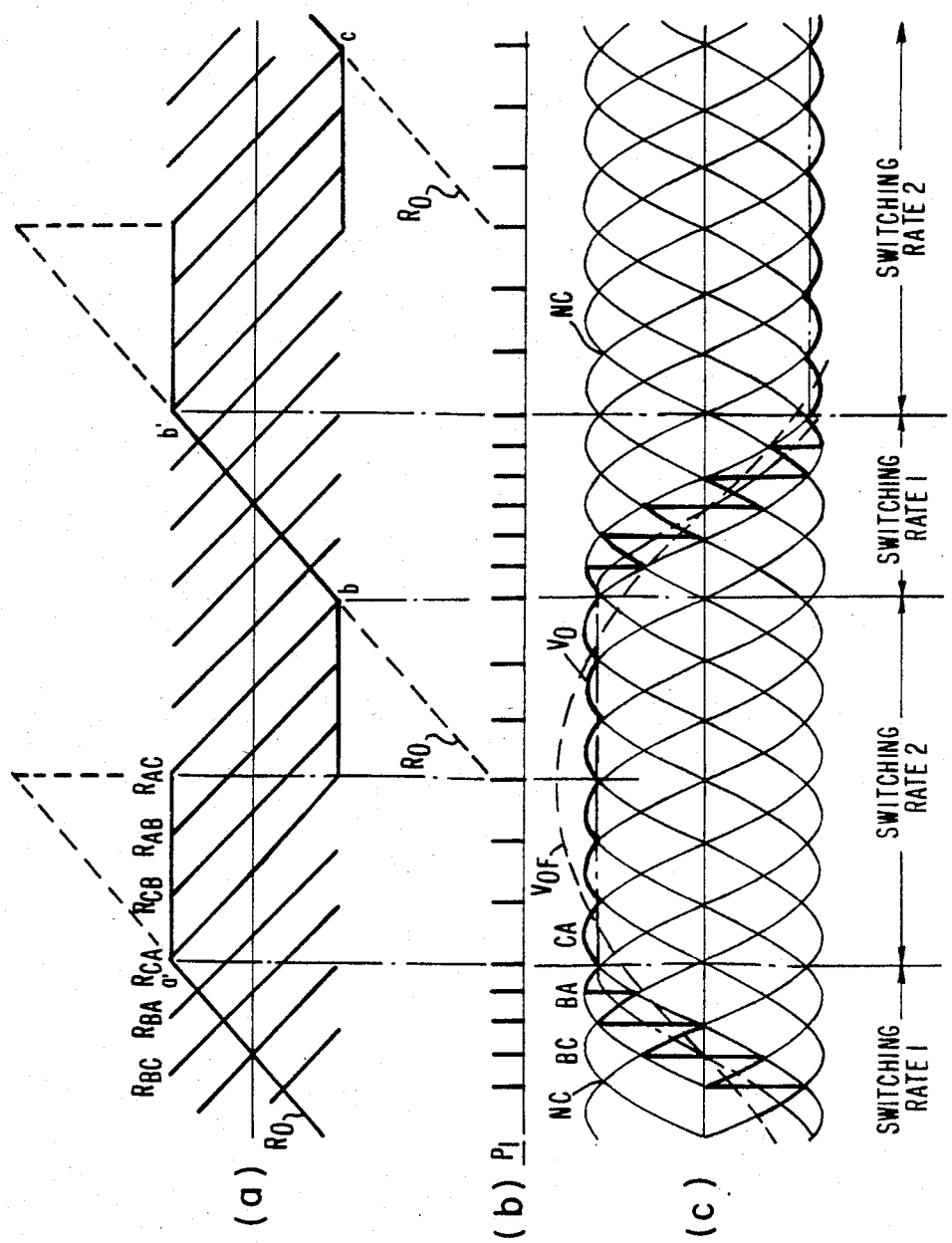

ADJUSTABLE FREQUENCY AC MOTOR DRIVE USING AN UNRESTRICTED FREQUENCY CHANGER SYSTEM

BACKGROUND OF THE INVENTION

The invention relates to static power frequency changers in general, and more particularly to Unrestricted Frequency Changers (UFC) and their applications, for instance to adjustable speed AC motor drives.

The Unrestricted Frequency Changer (UFC) and its adjunct static switch control for the generation of an AC wave of controlled voltage and frequency have been described in U.S. Pat. Nos. 3,470,447 and 3,493,838 of L. Gyugyi et al. These patents show how the switches in each of the static converters associated with an output phase of the load can be selectively and cyclically controlled for conduction during a predetermined time interval so as to derive and output power defined by a controlled increment of the input voltage, itself delineated between two time intervals are used for shorting the output, which process results in an AC output voltage having a frequency depending upon the repetition rate of the conduction time intervals and a magnitude measured by the time period of effective conduction of each static switch. Such an unrestricted frequency changer is advantageously applied in variable speed AC drives as explained on pages 5-14, and 363-383 of "Static Power Frequency Changers" by L. Gyugyi and B. R. Pelly, published by John Wiley & Sons 1976. In this regard, for instance, Gyugyi and Pelly have observed that the UFC has an inherent bilateral characteristic between the power source at its input and the load at its output, which allows a fourquadrant operation of the motor drive without costly additional circuitry.

The unrestricted frequency changer technique has become particularly attractive with the advent of modern semiconductor switches, for instance, power transistors, and GTO devices.

SUMMARY OF THE INVENTION

The present invention resides in controlling the bilateral switches for an Unrestricted Frequency Changer (UFC), in sequence within the switching cycle so as to generate a sinusoidal envelope at the output for the fundamental voltage in a first mode when the frequency of operation is below a predetermined limit, and so as to generate a trapezoid-like envelope at the output for the fundamental voltage in a second mode when the frequency of operation is above said predetermined limit.

BRIEF DESCRIPTION OF THE DRAWINGS

FIGS. 8A and 8B are two charts of curves illustrating control according to the invention for changing the output waveform from a sinusoidal envelope (FIG. 8A) to a trapezoidal envelope (FIG. 8B);

FIG. 9 shows the influence of a varying slope of the frequency reference wave, whereas FIG. 10 shows the influence with a varying frequency of the output wave;

DETAILED DESCRIPTION OF THE INVENTION

Figure 1:
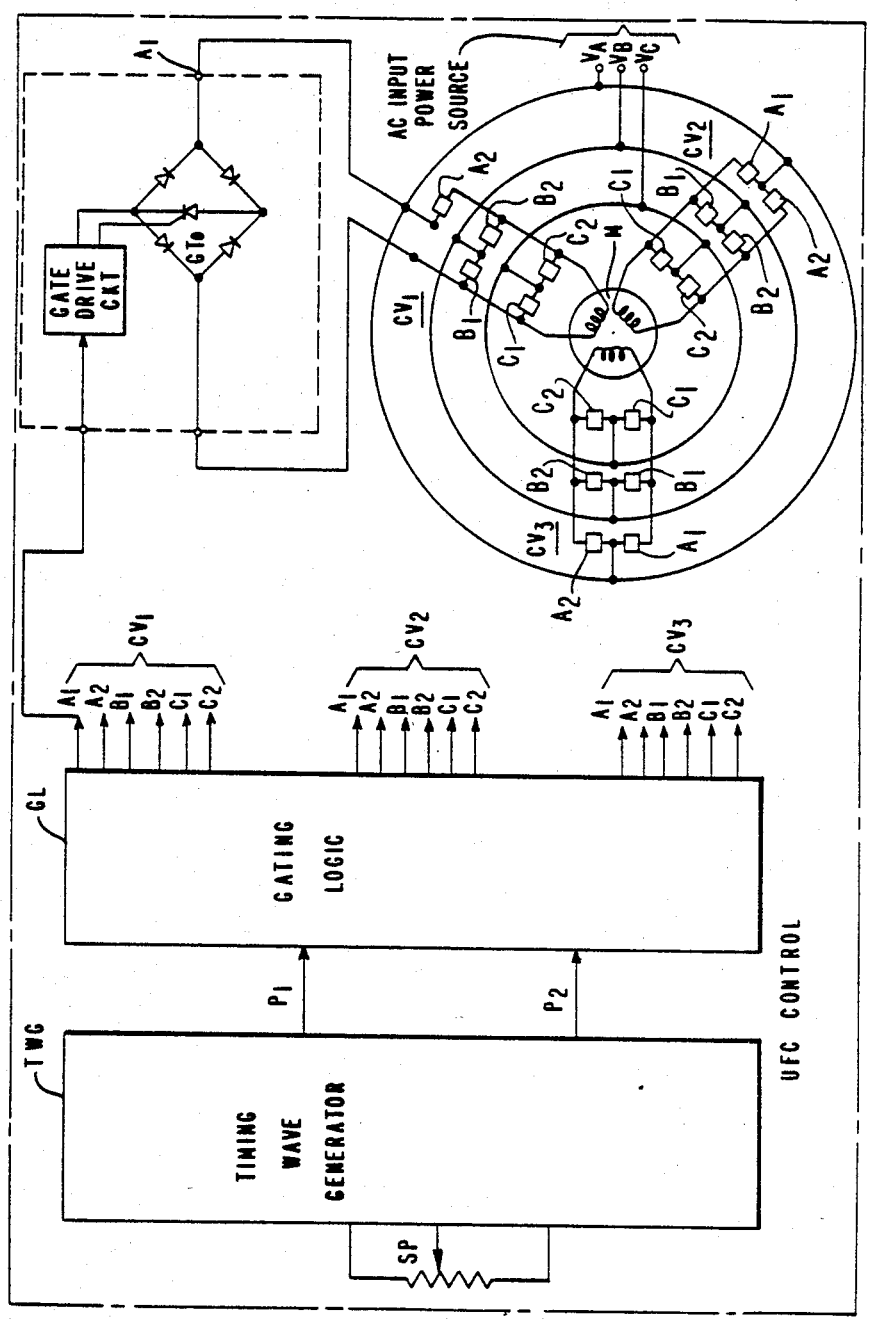
FIG. 1 is a block diagram in an UFC motor drive system according to aforementioned U.S. Pat. Nos. 3,470,447 and 3,493,838.

For the purpose of illustration the invention will be described as part of an AC drive system. It is understood, however, that the Unrestricted Frequency Changer (UFC) according to the invention can be used in a variety of industrial and other applications.

In the AC drive system of the preferred embodiment of the invention an Unrestricted Frequency Changer (UFC) is used to provide variable frequency-variable voltage output power to control the speed of an AC induction motor. In keeping with the volt-per-hertz characteristic of the induction motor, the fundamental output voltage is varied essentially in proportion with the output frequency. Such variation of the output voltage had been achieved up to now by simple pulse-width variation technique. This prior art approach resulted for the higher frequency range in a fundamental output voltage never exceeding at most, and even remaining beneath the magnitude of the input power supply. A new voltage control method is now proposed which maximizes the fundamental output voltage of the motor drive at high speed. This results in significant improvement in the attainable output power of the motor at high speed.

The Unrestricted Frequency Changer (UFC), described in U.S. Pat. Nos. 3,470,447 and 3,493,836 as a static "artificially" commutated frequency converter with variable output voltage, is well known in the literature, and this prior art type of converter will be hereinafter designated as the UFC.

When compared to other static power converters, the UFC has significant advantages that make it particularly suitable for providing variable frequency electric power to control the speed of AC motors. These advantages can be listed as follows:

1. Single stage power conversion with bidirectional power flow (i.e., power can flow either to, or from, the load). This permits regenerative braking of the motor.

2. A wide output frequency range, which is not limited by the input (supply) frequency. That is, the generated output frequency can be lower, higher, or equal to the input frequency. 3. The frequency spectrum of the output waveform is independent from the amplitude of the wanted fundamental component. Furthermore, the frequencies of the "unwanted" (harmonic) components in the output waveform are widely separated from the fundamental frequency over the total output frequency range. This separation of the harmonic frequencies from the fundamental increases "naturally" (i.e., without changing the method of output voltage waveform construction) as the fundamental output frequency decreases. Thus, the frequencies of the harmonic currents in the motor remain low at all output frequencies, and the motor runs at low speed without cogging.

4. The output voltage of a three-phase converter are inherently in balance. Nevertheless, individual control of the three output voltages is possible.

5. The inherent lagging (inductive) motor displacement power fractor results in leading (capacitive) displacement power factor (with equal phase angle) at the AC supply. Therefore, unity output (load) displacement power factor is reflected back to the AC supply without change.

6. Control is simple, that is, the output frequency and voltage can be controlled, as shown in the Gyugyi et al patents, by two appropriately displaced pulse trains, both having the same even rate.

However, in contrast to some other static controlled motor drives, the Unrestricted Frequency Changer has the disadvantage that with the prior art method of voltage control described in the above mentioned U.S. patents, the amplitude of the fundamental output voltage is always somewhat lower than that of the AC input supply voltage. It is desirable, however, for AC drive applications to be able to increase the attainable output power at higher operating speeds without affecting the performance of the drive at lower speeds.

The Unrestricted Frequency Changer (UFC) motor drive system described in the aforementioned U.S. Patents, is illustrated schematically in FIG. 1. It consists of three identical bidirectional converter power circuits, $CV_1$, $CV_2$, $CV_3$, supplying the three stator windings $W_1$, $W_2$, $W_3$, of an induction motor M, a gating logic GL generating the electrical signals necessary to turn ON and OFF the bilateral switching units ($A_1$, $A_2$, $B_1$, $B_2$, $C_1$, $C_2$) in each of the converters $CV_1$, $CV_2$, $CV_3$. A timing wave generator TWG is provided outputting two pulse trains $P_1$, $P_2$ in response to external analog signals which determine, through a setpoint SP, the output frequency $f_0$ and voltage $V_0$ applied to the motor. The relationship between the two control pulse trains $P_1$, $P_2$ and the output voltage $V_0$ of the UFC is illustrated by the waveforms (a), (b), (c) shown in FIG. 2. As seen by (a), pulse train $P_1$ determines the output frequency and in accordance with (b) pulse train $P_2$ determines the amplitude $V_0$ of the fundamental output voltage. The two pulse trains are so coordinated that the output voltage $V_0$ increases with increasing output frequency $f_0$ so as to maintain an essentially constant air-gap flux in the motor. FIG. 1 illustrates gating by the gating logic circuit GL of the gate drive circuit of switching unit $A_1$ within converter $CV_1$, switching unit $A_1$ having a GTO device mounted for bilateral operation. Switching unit $A_1$ is illustrative of the other switching units $A_2$, $B_1$, $B_2$, $C_1$ and $C_2$.

Figure 2:
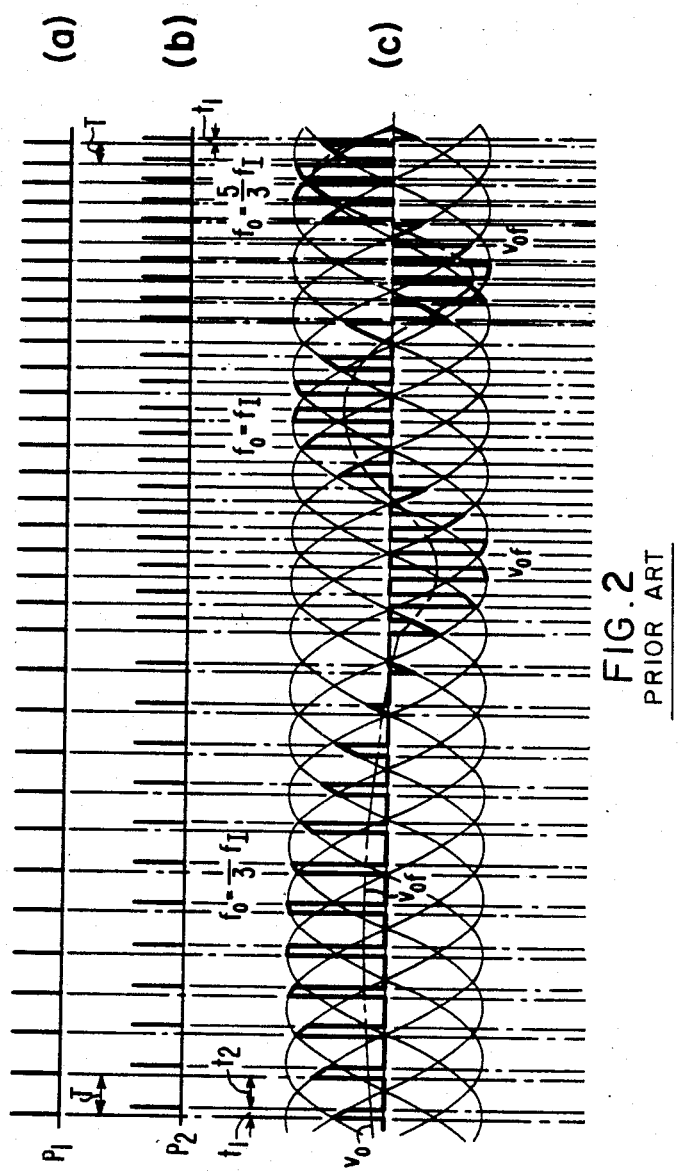
FIG. 2 is a chart illustrating with curves the effect of three different repetition rates and spacings of the control pulse trains P1, P2 of the system of FIG. 1 upon the output frequency and voltage and upon the output current.

It appears from curve (c) of FIG. 2, that between two consecutive pulses $P_1$, $P_2$ a segment of one of the input voltage waves provided by the input AC power source is connected to the output of the converter by the gated bilateral switches ($A_1$, $A_2$, $B_1$, $B_2$, ... or $C_2$). Between two consecutive pulses $P_2$ and $P_1$, the output of the converter is shorted by the bilateral switches. Such successive "segments of voltage" are derived from the input and applied to the output according to a definite conduction pattern which involves six consecutive different bilateral switches such as $A_1$ shown in the example of FIG. 1. Such successive "segments of voltage" are building up an alternating output voltage $V_0$ with an essentially sinusoidal envelope, as shown, for different output frequencies $f_0 = \frac{1}{3}f_I$, $f_0 = f_I$ and $f_0 = 5/3f_I$, by curve (c) of FIG. 2. The average of the "voltage segments" caused by conduction of a bilateral switch ($A_1$, $A_2$, $B_1$ . . . $C_2$) between two successive pulses $P_1$, $P_2$ (shown on FIG. 2 under (a) and (b), respectively) varies essentially sinusoidally over the output cycle as illustrated by the dotted line under (c) in FIG. 2.

The switching pattern depends upon the time interval between two consecutive pulses $P_1$, $P_2$ as well as upon the repetition rate of the two trains of pulses. In order to maintain a constant air-gap flux in the motor, when the frequency $f_0$ increases (increased repetition rate of $P_1$, $P_2$) the voltage $V_0$ is automatically increased by spacing more $P_1$ and $P_2$ from one another, thereby increasing the width of each "voltage segment". This is shown in FIG. 2 under (a), (b) and (c) for three instances of output frequency: $f_0 = \frac{1}{3}f_I$; $f_0 = f_I$ and $f_0 = 5/3f_I$, where $f_I$ is the frequency of the input AC power source supplying the three converters $CV_1$, $CV_2$, $CV_3$.

Figure 3A:
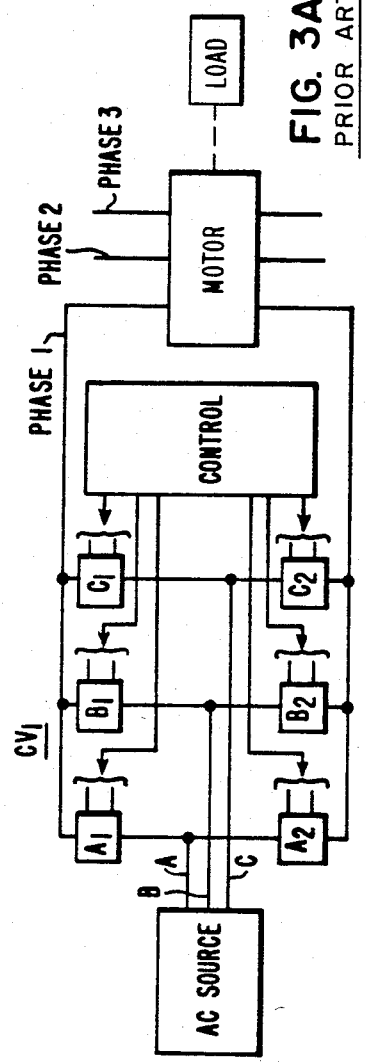
FIG. 3A shows the three phases of FIG. 1 associated with the load.

FIG. 3A shows the UFC connected with the three phases of the load.

Figure 3:
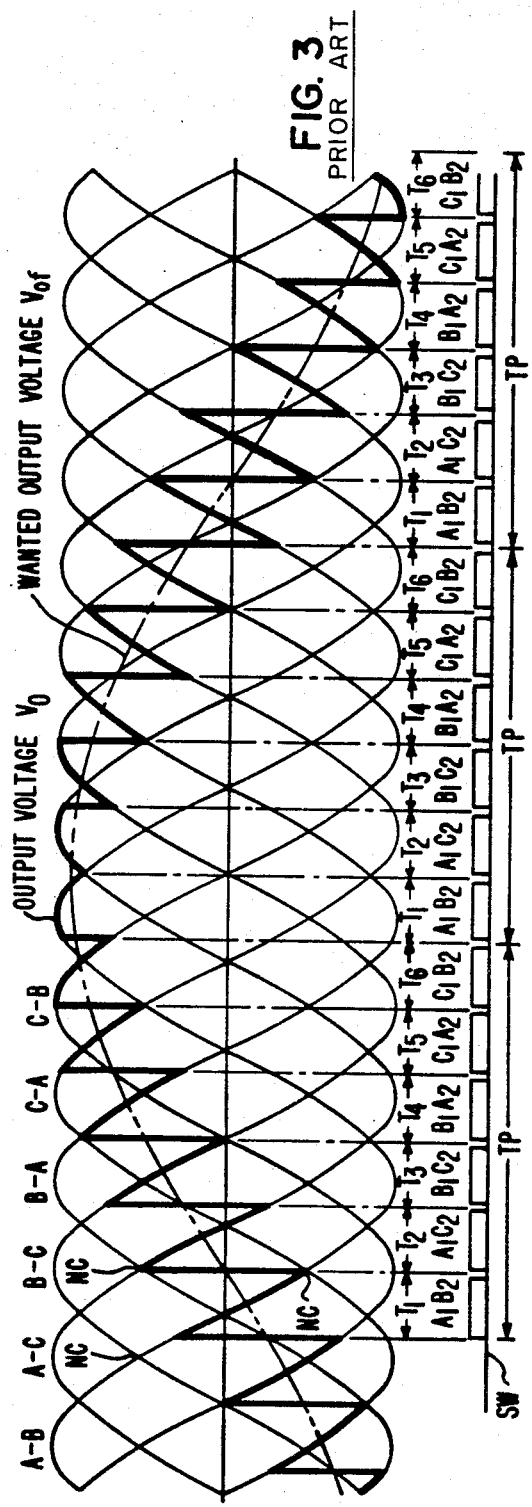
FIG. 3 shows with curves the operation of the system of FIG. 1 and FIG. 3A without exercising any control of the switches of the converters for the purpose of adjusting the magnitude of the output voltage whereas, for comparison purpose.
Figure 4:
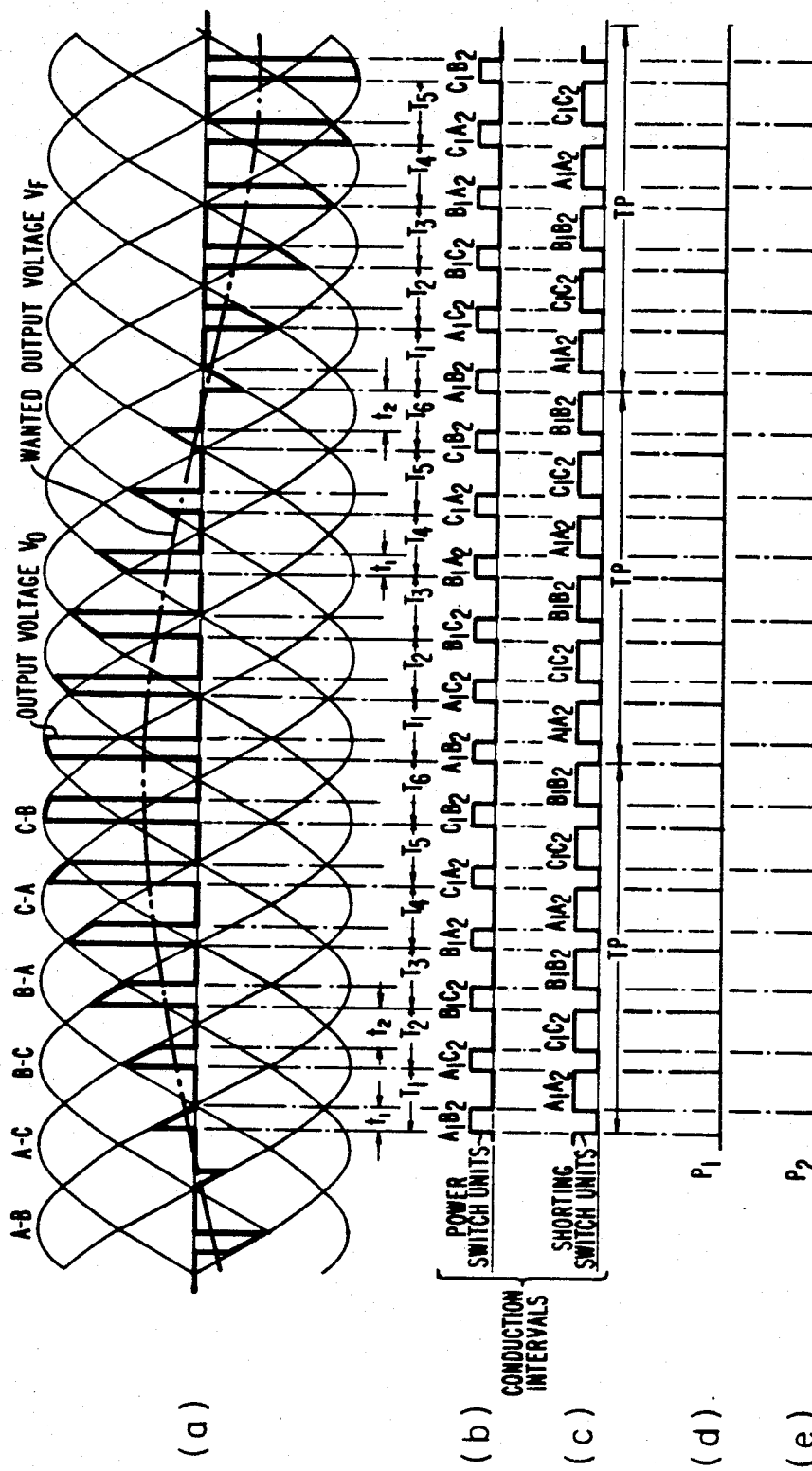
FIG. 4 shows with curves how the control pulse trains P1 and P2 of the system of FIG. 1 establish controlled periods of conduction delineated between controlled shorting periods to adjust the magnitude of the output voltage.

The basic operating principles of the UFC will be better understood by referring to the waveforms shown in FIGS. 3 and 4 for one of the three outputs of the UFC. The basic output voltage waveform $V_0$ of the UFC, ignoring for the moment the control of the magnitude of the fundamental component, can be generated by allowing the pairs of switching units $A_1B_2$, $A_1C_2$, $B_1C_2$, $B_1A_2$, $C_1A_2$, $C_1B_2$ to conduct, in that sequence, for a fixed period of time T, so that each of the input line voltages be connected in turn across the load during that pause period of time. The sequence is repeated at a predetermined repetition rate. As illustrated in FIG. 3, such repetitive switching pattern extends over a time period TP defined by the consecutive uniform time frames T, individually indicated at $T_1$, $T_2$, $T_3$, $T_4$, $T_5$, and $T_6$. This switching pattern provides an output voltage wave $V_0$ having a "wanted" fundamental component $V_{OF}$ with a frequency $f_0$ equal to the difference between the AC supply frequency $f_{IN}$ and the repetition frequency $f_{SW}$ of the switching pattern, as explained in the above-mentioned patents.

While FIG. 3 illustrates the operation of a system in which for each bilateral switching unit the conduction interval (T) extends fully between two consecutive switching points NC, e.g. between two ON-coming static switches in the succession ($A_1B_2$, $A_1C_2$, $B_1C_2$, . .

. $C_1B_2$), FIG. 4 illustrates a system in which the duration of conduction (T) is controlled, e.g. reduced from such maximum duration T to $t_1$. As shown in FIG. 4 this is achieved by shorting the output terminals, that is, the load, during a complementary time interval $t_2=(T-t_1)$. This is achieved by the pair of switches connected to the same input line ($A_1A_2$, $C_1C_2$, ... $B_1B_2$). Such width-control of $t_1$ within T allows the control of the fundamental output voltage, as explained in either of the two aforementioned patents. This mode of control is characterized by a repetitive switching pattern extending over the time period TP that is defined by six uniformly spaced time frames T labeled $T_1$ through $T_6$. In time frame $T_1$, power switches $A_1$ and $B_2$ are turned on for the time interval $t_1$. At the end of the interval $t_1$, switches $A_1$ and $A_2$ are turned on for the duration of interval $t_2$ to short the load and thereby provide a path for the load current. In the next time frame $T_2$, switches $A_1$ and $C_2$ are turned on for the duration of interval $t_1$ to apply an increment of input voltage $V_{AC}$ to the load. At the end of interval $t_1$ of time frame $T_2$, switches $A_1$ and $C_2$ are turned off and switches $C_1$ and $C_2$ are turned on for the duration of interval $t_2$ of the same time frame to short the load. The rest of the sequence in the switching pattern should be apparent from examination of FIG. 4. It is also obvious from the figure that pulse train $P_1$ defines the time frame T, and thereby the output frequency of the fundamental or wanted output voltage $V_F$ of output voltage wave $V_0$, whereas pulse train $P_2$ defines the relative length of intervals $t_1$ and $t_2$, in the given time frame T, and thus determines the amplitude of the fundamental component $V_F$.

Figure 5:
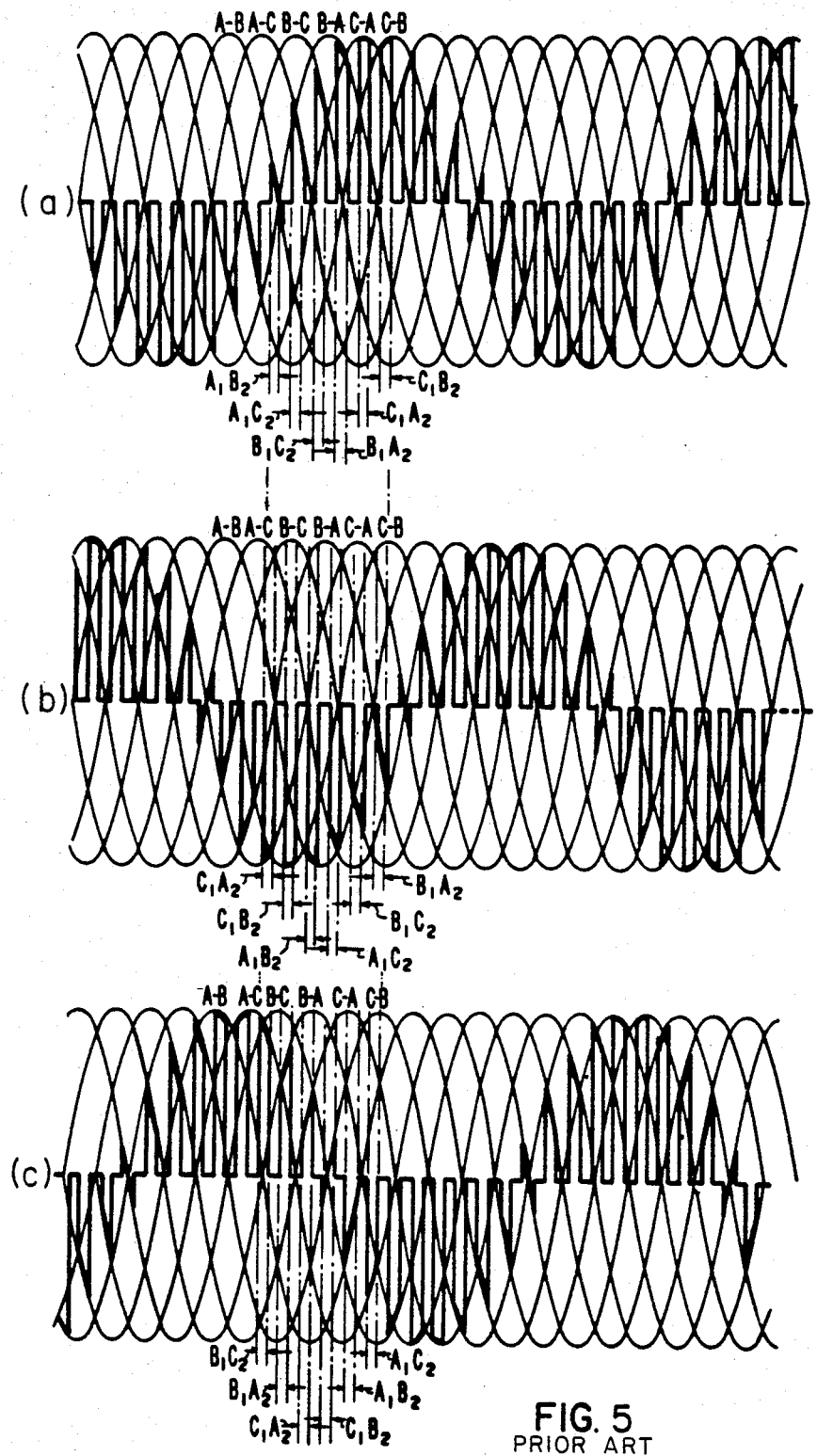
FIG. 5 is a chart with curves comparing the three phases of the UFC system of FIG. 1.

The switching pattern for the three phases of a complete three-phase UFC is shown in FIG. 5.

Figure 6:
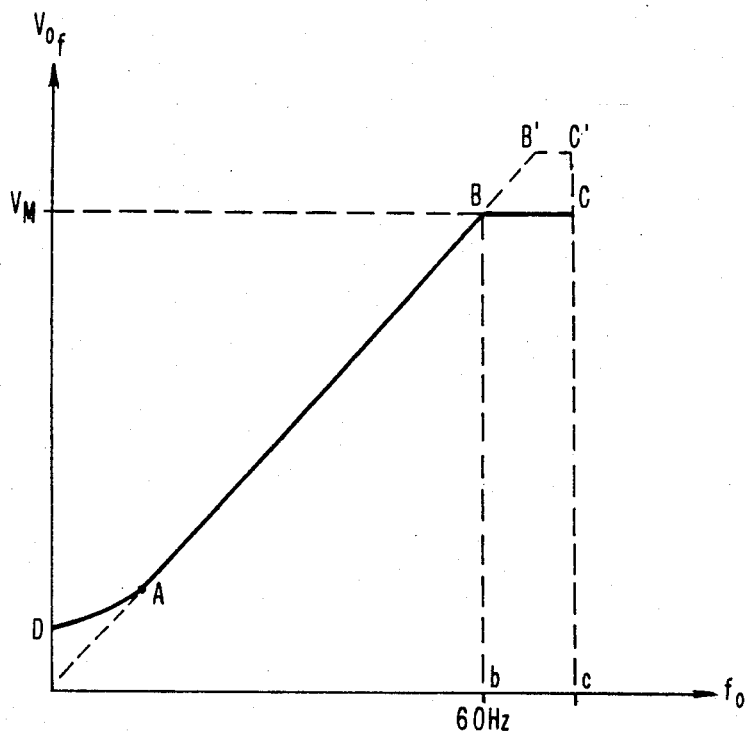
FIG. 6 is typical of the voltage-to-frequency linear characteristic of an induction motor under constant volt-hertz ratio.

Referring to FIG. 6, curve AB illustrates the linear characteristic of a variable frequency motor drive, the voltage applied to the induction motor being maintained in a constant relation with the frequency.

It is known that variable frequency motor drives in general operate under a constant volt-hertz ratio. This condition optimizes the operation of the AC motor supplied with AC current. On the one hand, the induction motor preferably should be operating under an optimum flux level, e.g., the magnetizing force is kept constant when the frequency varies. Since the magnetizing flux is proportional to voltage and inversely proportional to frequency, the condition is achieved by varying the voltage in the same proportion as does the frequency.

Typically with an inverter supplied AC motor like shown in U.S. Pat. No. 4,080,544, the inverters having a controlled time of conduction of the DC energy supplied to the AC motor in either direction, such time of conduction becomes larger for a given time interval when the frequency increases, and so does the voltage output. Conversely, the voltage decreases when frequency decreases. Therefore, by keeping the controlled time of conduction constant the requirement that voltage follow frequency variations is automatically respected as frequency varies. Not so with an Unrestricted Frequency Changer (UFC).

As explained on pages 202 and 203 of "Static Power Frequency Changers" by L. Gyugyi and B. R. Pelly (John Wiley & Sons, 1976) the maximum amplitude of the wanted component outputted by the UFC is $$V_{o\,max} = S \frac{3\sqrt{3}}{2\pi} V_I$$

where $V_I$ is the amplitude of the input line to neutral voltage of each three pulse group and S is the number of three pulse groups connected in series in each output phase.

With a six pulse UFC like in FIG. 1, the maximum voltage is $V_{0\,max}=3V_I/\pi$. It is now observed, that such limitation in maximizing the output voltage of the UFC, e.g. of the applied voltage of the induction motor in a motor drive, is due to the fact that the envelope $V_{of}$ of the output voltage $V_0$ as shown in FIG. 3, or by curves (a) of FIG. 4 is essentially sinusoidal. In order to overcome this limitation, it is now proposed to generate an output waveform having an envelope which changes from that of a sine wave to that of a trapezoid-like wave at appropriately high output frequencies, and approaching increasingly a square wave as the output frequency is further increased. In this way, it has been possible to increase the fundamental output voltage $V_{of}$ at, and close to, the maximum operating speed of the motor by about 15 to 20 percent, thereby increasing the output power to approximately 30 to 40 percent without encountering significant problems with the additional harmonics generated.

To increase the fundamental output voltage above that obtainable with the prior art control method, it is necessary to change the basic time frame T over the cycle time of the output voltage wave. The control method proposed can produce the output waveform with either sinusoidal and trapezoidal envelopes in such a way that the transition from one type to the other be smooth, gradual and controllable.

Before considering the new control method involving signals $P_1$ and $P_2$ of FIGS. 1 to 4, the conventional method explained in U.S. Pat. Nos. 3,470,447 and 3,493,938 of L. Gyugyi et al. will be first summarily recalled.

It may be noted that to connect any pair of lines in FIG. 1 to the load requires a switching unit having at least two bilateral switches BS. It is thus seen that the respective switching units $A_1B_2$, $B_1A_2$, $A_1C_2$, $C_1A_2$, $B_1C_2$ and $C_1B_2$, when individually operated, can effect six different circuit configurations involving the input lines and the load, each of the circuit configurations involving a pair of the input lines and the load in a particular one of the two possible reversely related modes of connection. Thus each of the switching units when turned ON provides a different one of six different circuit configurations between said input lines and the output circuit, each of said circuit configurations interconnecting the load and a pair of the input lines. For purposes of discussion, the individual bilateral switches BS are assumed to be perfect, that is they can be closed and opened at any given time instant, and when closed, the current is free to flow in either direction at all times.

Let it first be assumed that control circuit CT of FIG. 3A is so arranged that switching units $A_1B_2$, $A_1C_2$, $B_1C_2$, $B_1A_2$, $C_1A_2$, $C_1B_2$, are allowed to conduct in that sequence for a fixed period of time T, so that each of the input line voltages is in turn connected across the load for the same interval of time, the sequence being repeated at a predetermined repetition rate R. As is illustrated in FIG. 4, this cyclic or repetitive switching pattern extends over a time period TP defined by six consecutive uniform time frames T, individually indicated at $T_1$, $T_2$, $T_3$, $T_4$, $T_5$ and $T_6$. Each switching unit is ON for a full time frame T as indicated by the switching curve SW in FIG. 4. This pattern of switching provides an output voltage wave $V_0$ having a "wanted" fundamental $V_{OF}$ with a frequency $f_0$ equal to the difference between the frequency $f_I$ of the input alternating current and the repetition frequency fsw of the switching pattern. The system and above type of control which produces this output voltage waveshape is potentially well suited to the speed control of an AC machine for the following reasons: A wide output frequency range is possible; frequencies on either side of line frequency can be obtained; the transition through line frequency is without incident; the frequency of the lowest harmonic component is widely separated from the "fundamental" frequency and there are no DC or subharmonic components.

While this type of control has its advantages it is considerably restricted in its field of application because, although frequency control is possible, control of the output voltage cannot be achieved, except by controlling the input voltage. Thus this type of control cannot be economically applied to the speed control of an AC machine.

The conduction angle or dwell time of each switching unit is for the full extent (assuming perfect switches) of its associated time frame T. For example it is readily seen in FIG. 3, that for the time frame $T_1$, switching unit $A_1B_2$ applies the input voltage A-B to the load for the full duration of the frame. In the next frame ($T_2$), switching unit $A_1C_2$ is turned on to apply voltage A-C to the load for the full duration of the frame $T_2$, and so on.

Figure 7:
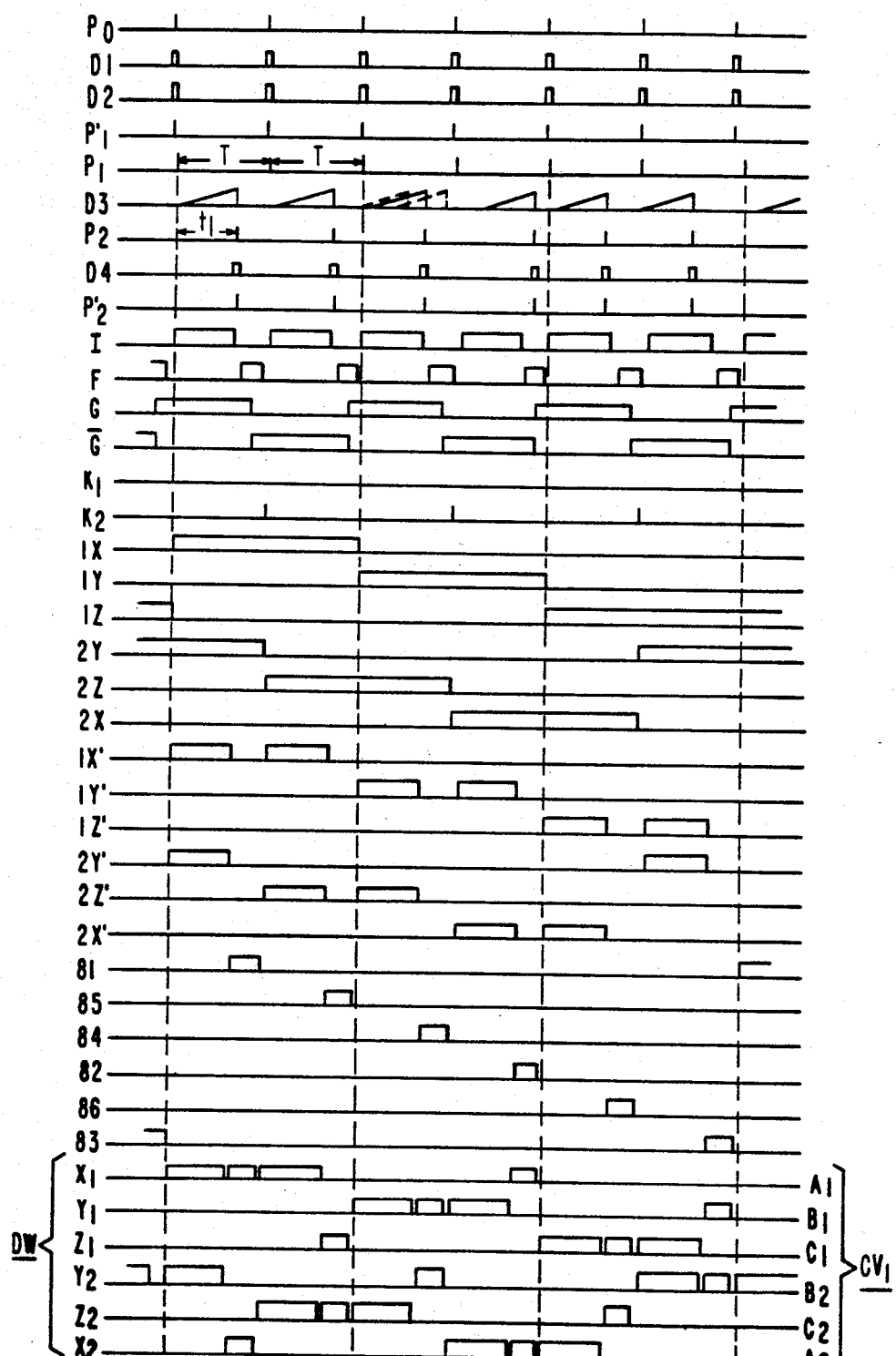
FIG. 7 is a chart of curves showing the generation of signals P1, P2 of FIG. 1 and the derivation of driver signals for converters such as in the system of FIG. 1.

The switches in each of converters $CV_1$, $CV_2$, $CV_3$ are driven under the prior art control mode in accordance with six drive waveforms DW shown at the bottom of FIG. 7 and referenced at their left ends as $X_1$, $Y_1$, $Z_1$, $Y_2$, $Z_2$ and $X_2$, except that the sets of drive waveforms for each of the converters is displaced 120° from the drive waveforms for the next converter. For example, if these drive waveforms are arbitrarily assigned to the switches of converter $CV_1$ the distribution indicated at the right end of the waveforms, then the drive waveforms for converter $CV_2$ will be the same except displaced by 120° from the $CV_1$ set of drive forms, and the drive waveforms for converter $CV_3$ will be the same except displaced 120° from the drive waveforms of converter $CV_2$. A common control circuit produces the set DW of drive waveforms and distributes them between the three converters $CV_1$, $CV_2$, and $CV_3$.

The repetitive rate of pulses $P_1$, $P_2$ of FIGS. 1, 2 and 4 is provided by a timing waveform generator having a clock the output frequency of which is adjustable in response to adjustment of the magnitude of a reference voltage applied through setpoint SP of FIG. 1. Thus, all the curves of FIG. 7 are along the same relative time base. The output of the generator consists of a train of short duration pulses $P_0$, uniformly spaced and occurring at regular time intervals. Pulses $P_0$ are fed to a circuit introducing a fixed time delay $D_1$. This results in output pulses $P'_1$. Pulses $P'_1$ are fed to another time delay $D_2$, thereby to generate output pulses $P_1$, further delayed with respect to pulses $P_0$.

Figure 10:
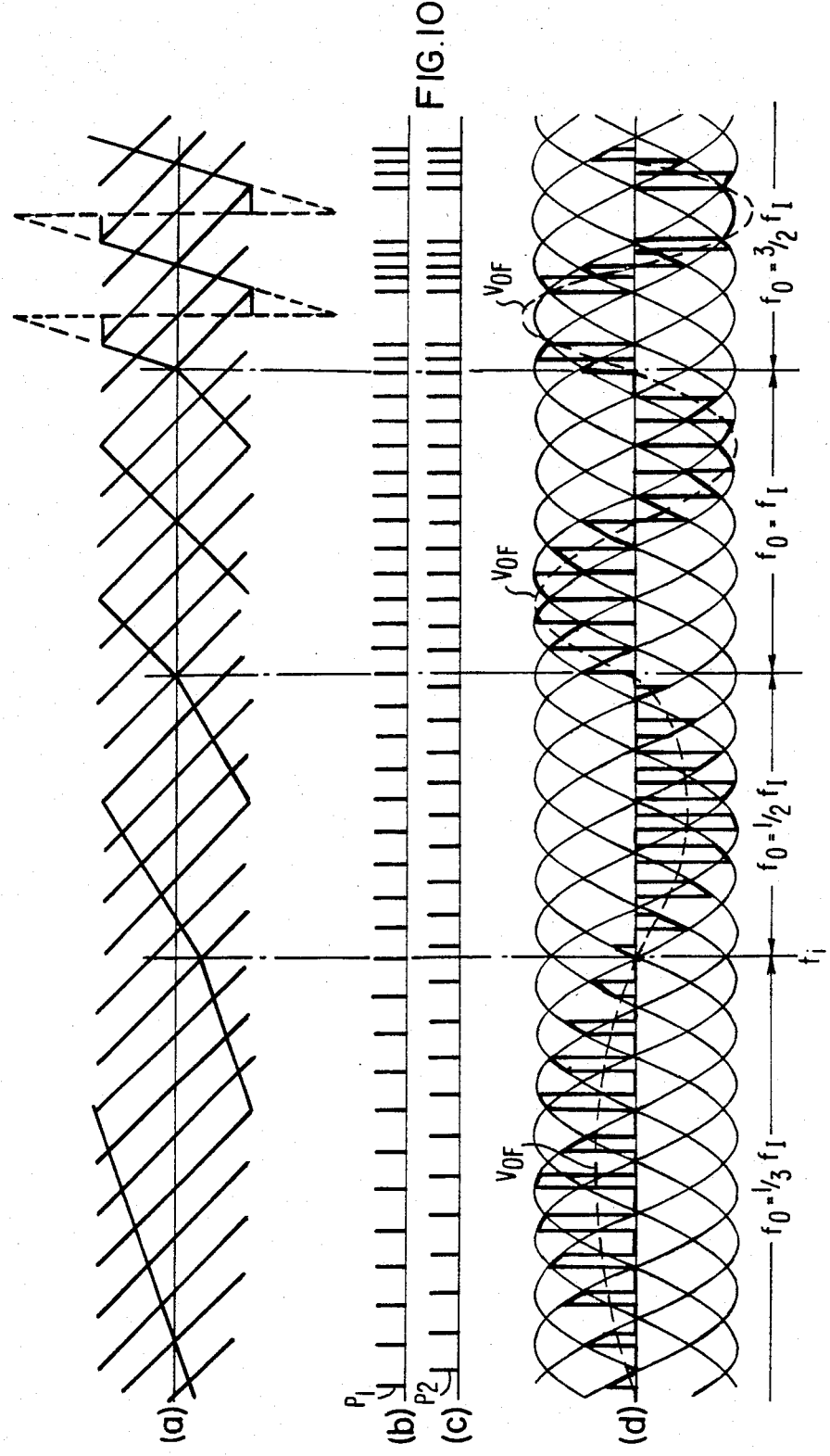

Pulses $P_1$ are fed to a variable delay circuit providing output pulses $P_2$, delayed by a time $t_1$ with respect to pulses $P_1$. This time delay is shown as an adjustably timed ramp function $D_3$, the output trailing edge of which is differentiated to produce the pulses $P_2$. The adjustability of the timing waveform is symbolized by two random adjustments shown in dotted form on $D_3$. Pulse I of FIG. 10 is defined by a flip flop in response to the delayed pulse $P_2$ or, in the event of the time delay setting of delay $D_3$ be greater than the interval between pulses $P_1$ and the reset pulses $P_0$, by the latter pulse $P_0$. Thus pulses $P_0$ serve as "end stop" pulses and mark the limits of periods $t_1$. Since the delay between pulses $P_0$ and $P_1$ is relatively short, the maximum possible time, $t_1$ becomes then, nearly equal to the time T. Under such condition the maximum possible practical output voltage is obtained from the UFC as in the case of FIG. 3. Pulse I is reset to zero by pulses $P_1$ (its values are I and $\bar{I}$).

Pulses, $P_1$ are used to initiate conduction of the power transfer switching units ($A_1$, $A_2$, ... $C_1$, $C_2$). Pulses $P_2$ are at the same rate, but adjustably displaced by a chosen time interval $t_1$. These pulses are employed to terminate the conduction dwell time of the switching unit. Thus, pulse train $P_1$ will determine the output frequency and pulse train $P_2$ will determine the output voltage. By varying the positions of pulses $P_2$ relative to pulses $P_1$, the ratio of conduction intervals of dwell times $t_1$ to conduction dwell times $t_2$ is varied, thereby varying the magnitude of the average output voltage, as explained in the aforementioned U.S. patents.

Pulses $P_2$ are also transmitted through a delay $D_4$ to provide pulse train $P'_2$. Pulse train $P'_2$ is delayed with respect to pulse train $P_2$ by a short time necessary to turn OFF the power transfer switching units. Pulses $P'_2$ are used to initiate the conduction of switching units, the purpose of which is to create a "shorting" path interrupting the passing of energy to the load. A pulse train $P'_1$ out of the output of delay $D_1$ slightly precedes pulses $P_1$ thereby to give time to initiate the subsequent power transfer switching units. Thus pulses $P'_1$ are employed to terminate the previous "shorting" conduction interval as shown by signal F.

Thus, a single pulse train with an even rate of pulses per second is employed to initiate the interval $t_1$, and a second pulse train, with the same even rates, but with an appropriate displacement relative to the first train is employed to end the time period $t_1$ and to initiate the time interval $t_2$.

The I signal represents the conduction period for outputting a "slice" of AC voltage from the input power source. The F signal is used for "shorting". Distribution and application of the "slice" and "shorting" control signals is effected with the assist of a ringcounter function. To this effect in a conventional manner the clock pulses $P_0$ are used to trigger a common-trigger type flip-flop producing two rectangular pulse trains, $\bar{G}$ and $\bar{G}$. Pulses G always overlap even $P_1$ pulses, whereas the $\bar{G}$ pulses overlap the odd $P_1$ pulses. Pulses $K_1$ and $K_2$ are obtained by feeding pulses G and $P_1$ and $\bar{G}$ and $P_1$ respectively, to two AND gates. Pulses $K_1$ and $K_2$ are fed to the inputs of two three-stage ring counters, respectively. The outputs of one ring counter are 1X, 1Y and 1Z. The outputs of the other ring counter are shown as 2X, 2Y and 2Z. The respective outputs of waveforms 1X', 1Y', 1Z', 2Z', 2Y' and 2X' are obtained. These are the basic drive waveforms for rendering conductive the power transfer switching units during the "slice" time intervals $t_1$. As previously described, pulses F define the intervals $t_2$ during which the "shorting" switching units conduct. These pulses are distributed into six separate pulse trains 81–86 in a cyclic manner. Waveforms DW represent the driver signals as applied from 1X', 1Y', 1Z', 2X', 2Y', 2Z' and 81–83 once combined after distribution onto the individual bilateral static switches, in the instance of one output phase, namely converter $CV_1$. The relationship between the driver signals and the switching units is as follows: $X_1$ for $A_1$; $Y_1$ for $B_1$; $Z_1$ for $C_1$; $Y_2$ for $B_2$; $t_2$ for $C_2$ and $X_2$ for $A_2$.

For the purpose of fully describing operation and control of the UFC induction motor drive system of the prior art over which the present invention is an improvement, the aforementioned U.S. Pat. Nos. 3,479,447 and 3,493,838 hereby incorporated by reference.

Figure 15:
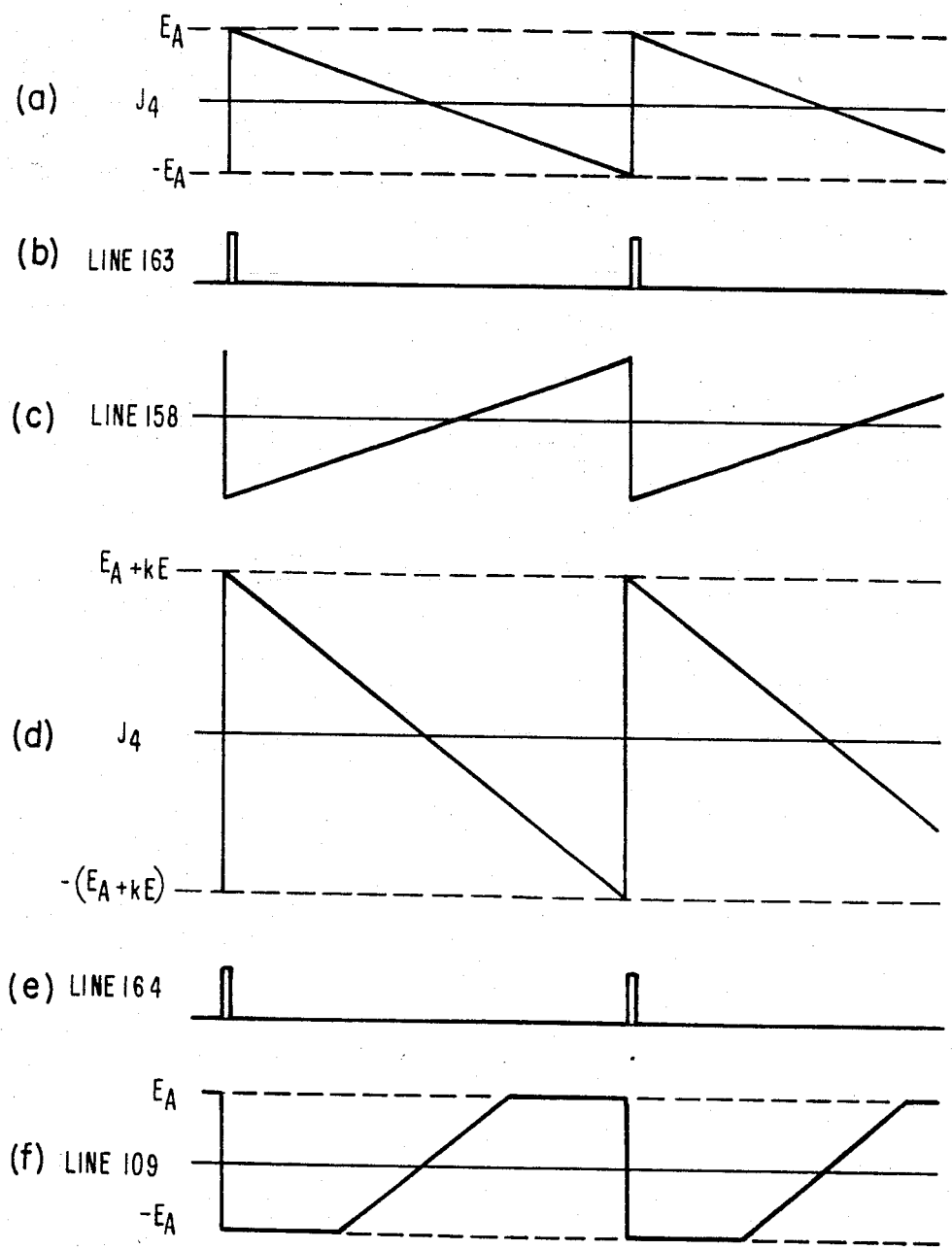
FIG. 15 is a chart of curves illustrating the operation of the generator of FIG. 14.

Conventional control of an Unrestricted Frequency Changer has been implemented by utilizing the three-phase bridge-type converters, the bilateral static switches and the isolated distribution circuits of the prior art UFC apparatus shown in FIGS. 7, 15 and 17, respectively of the incorporated by reference U.S. patents. The basic functional requirements of the control circuits of the proposed UFC apparatus and for the prior art UFC apparatus are identical regarding the control of the output frequency as defined by an external voltage reference, the control of the output voltage as a function of the output frequency (a requirement of the AC motor drive application), the control of the total conduction period $t_1$ of each basic time frame T, to produce the required amplitude of the fundamental component of the output voltage waveforms, and the generation of the repetitive UFC switching pattern sequences defined in FIG. 4 herein.

A new control method is now proposed in which, when the frequency is increased beyond a predetermined limit, the conventional mode of control is abandoned, and a second mode is used in order to cause a trapezoid-like envelope to be generated, such trapezoid-like shape being, as needed, increasingly chosen to conform so as to approach a square-shaped envelope.

The basic principle of the proposed control method is illustrated by FIGS. 8 and 8B. In this method, the pulse train $P_1$ determining the frequency $f_0$ of the output voltage $V_0$ is derived from the intersection of a linear ramp "frequency reference wave" $R_0$, with a set of linear ramp "timing waves", $R_{AB}$, $R_{AC}$, $R_{BC}$, $R_{BA}$, $R_{CA}$, and $R_{CB}$. The ramp timing waves have a repetition frequency of $2f_I$ ($f_I$ is the input supply frequency) and they are displaced from each other by 60 electrical degrees measured at the angular frequency of $\omega_I = 2\pi f_I$. The frequency reference ramp $R_0$ has a repetition frequency of $2f_0$ ($f_0$ is the wanted output frequency).

Figure 8A:
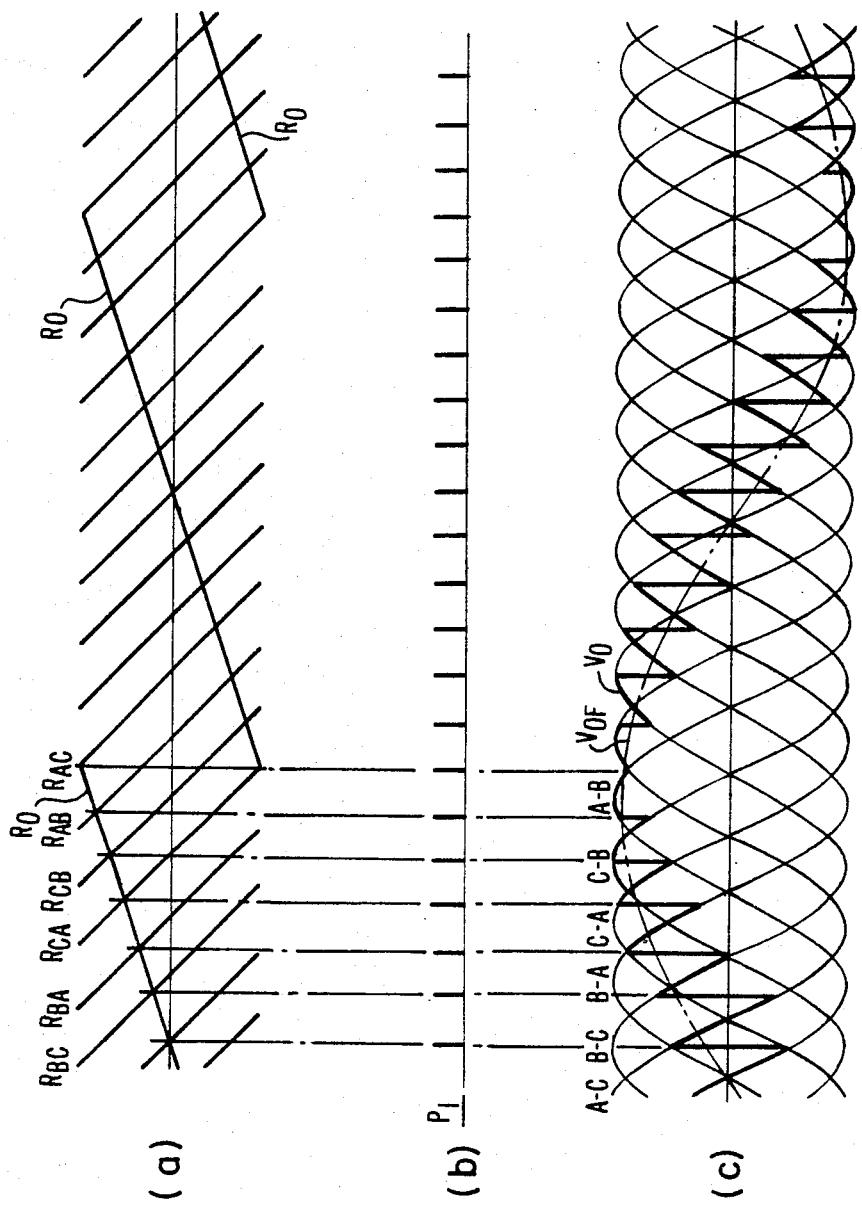

To obtain with such ramps a pulse train $P_1$ which according to the teachings of the prior art has an even repetition rate thereby to generate a sinusoidal UFC output waveform, it is only necessary to make the frequency reference ramp and timing ramp peak approximately at the same level as illustrated by FIG. 8A.

According to the present invention the ramps are used to generate a pulse train of a rate different during the cycle of the output wave. For the control method proposed to this effect, an appropriate phase relationship is established between the ramp timing waves and the corresponding ac input supply voltage waves. In addition, the frequency reference ramp $R_0$ made variable, so that its magnitude can become larger than the peak of the ramp timing waves as indicated in dotted line in FIGS. 8B, 9 and 10. According to the preferred embodiment, the ramp timing waves ($R_{AB}$, $R_{AC}$...) are displaced from the zerocrossings of the corresponding input supply voltage waves ($V_{AB}$, $V_{AC}$...) by 60 electrical degrees (measured at the angular frequency of the input voltage waves), that is, $R_{AB}$ lags $V_{AB}$, $R_{AC}$ lags $V_{AC}$, etc., by 60 electrical degrees as indicated in FIG. 8A. Stated another way, the peaks of the ramp timing waves coincide in time with the occurrence of a natural commutation point between consecutive waves $V_{AB}$, $V_{AC}$...

As illustrated by FIG. 8B, an output waveform having a trapezoid-like envelope can be generated by simply increasing the peak of the frequency reference ramp $R_0$ above the peak level of the timing ramps. The larger the peaks of the reference ramp becomes in relation to the peaks of the timing ramps, the more the rate of pulses $P_1$ is increased during such period as the frequency ramp $R_0$ is effective to intersect a succession of timing ramps (portions aa', bb', cd, ...). Between such periods, namely while the frequency reference ramp reaches a magnitude which is larger than the peak level of the timing ramp waves, the pulses $P_1$ are generated at the starting time instants of the timing ramps, as if the frequency ramp were "clamped" to a magnitude slightly below such peak level. Therefore, pulses $P_1$ are generated at a rate corresponding to the regular 60 degree intervals of the natural commutation points of the input voltage waves ($V_{AB}$, $V_{BC}$...). With this arrangement the rate of the $P_1$ pulse train varies from a maximum value, determined by the slope of the reference ramp, to a minimum value that is equal to six times the input supply frequency.

Figure 9:
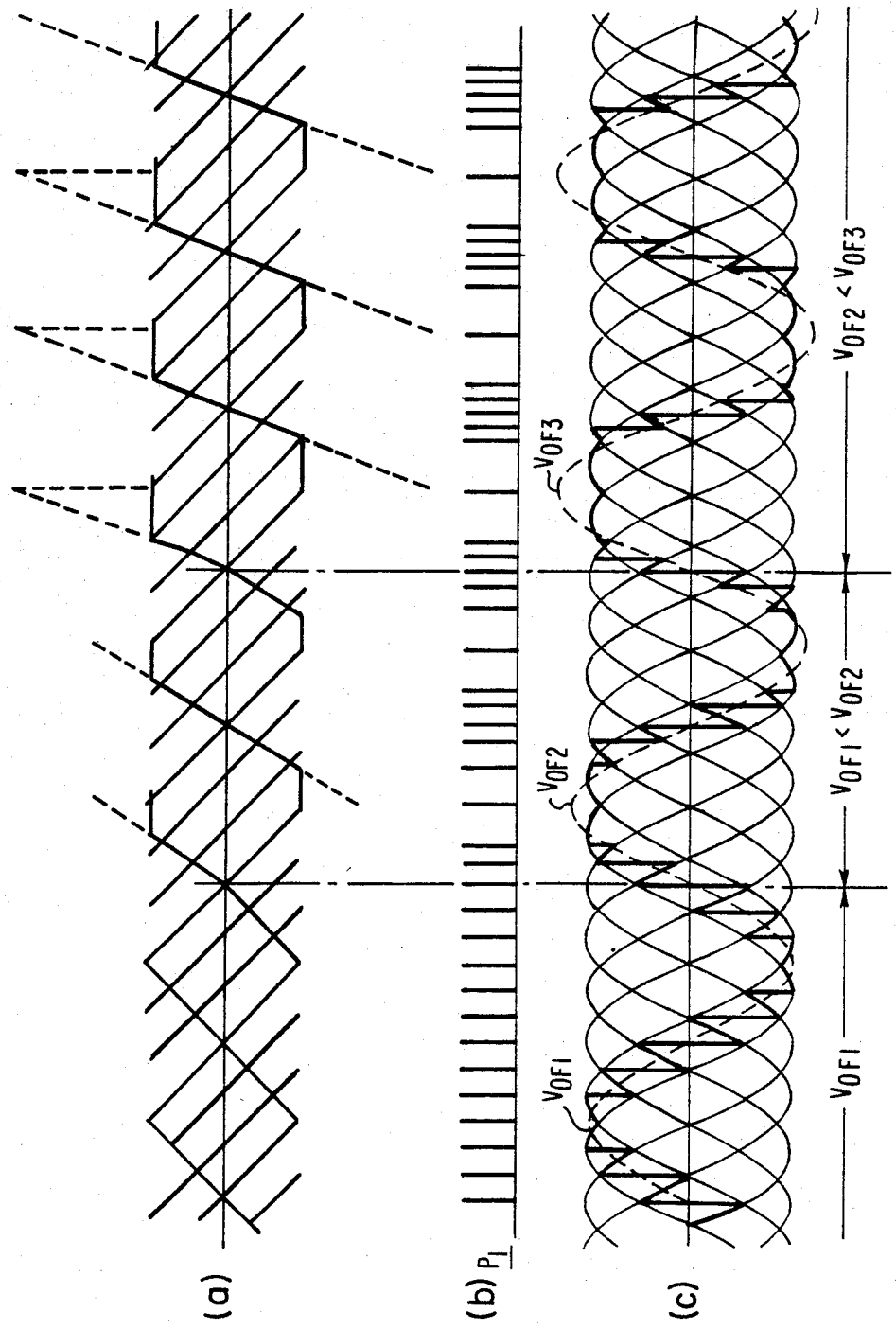
FIGS. 9 and 10 illustrate with curves how by pulse control the trapezoidal envelope of FIG. 8B is made increasingly more abrupt until a point where it becomes nearly square wave shaped.

FIG. 9 illustrates the fact that for a given output frequency ($f_0 = f_I$) the envelope of the trapezoidal output voltage waveform approaches a square wave, and, consequently, the amplitude of the fundamental component increases, as the slope of the frequency reference ramp increases while its repetition rate (occurrence from peak to peak) remain the same.

It appears that the control system according to the invention for a UFC type motor drive provides output voltage and frequency control which is similar to that obtained with the prior art control as long as the output frequency is below a selected value. Then, the fundamental output voltage increases approximately in proportion with the output frequency until a maximum value as attainable with the prior art UFC namely, generating an output voltage waveform with sinusoidal envelope) is reached. Above such selected frequency, the fundamental component of the output voltage can be further increased by producing an output voltage waveform having a trapezoid-like envelope. The latter increasingly approaches a square-wave like shape as the output frequency approaches its maximum operating value.

How to achieve this mode of control is illustrated by the waveforms shown in FIG. 10. The curves of FIG. 10 show that until time ti the output voltage is controlled in proportion disclosed to the output frequency by the pulse-width variation technique disclosed in the aforementioned U.S. patents, namely, until the output frequency reaches a selected value, for example, $f_0 = f_I$. Above this frequency, that is, after instant ti, the fundamental component of the output voltage wave is increased by the method according to the present invention, e.g. by changing the slope of the frequency reference ramp $R_0$, so as to generate an output waveform having a trapezoid-like envelope.

Figure 11:
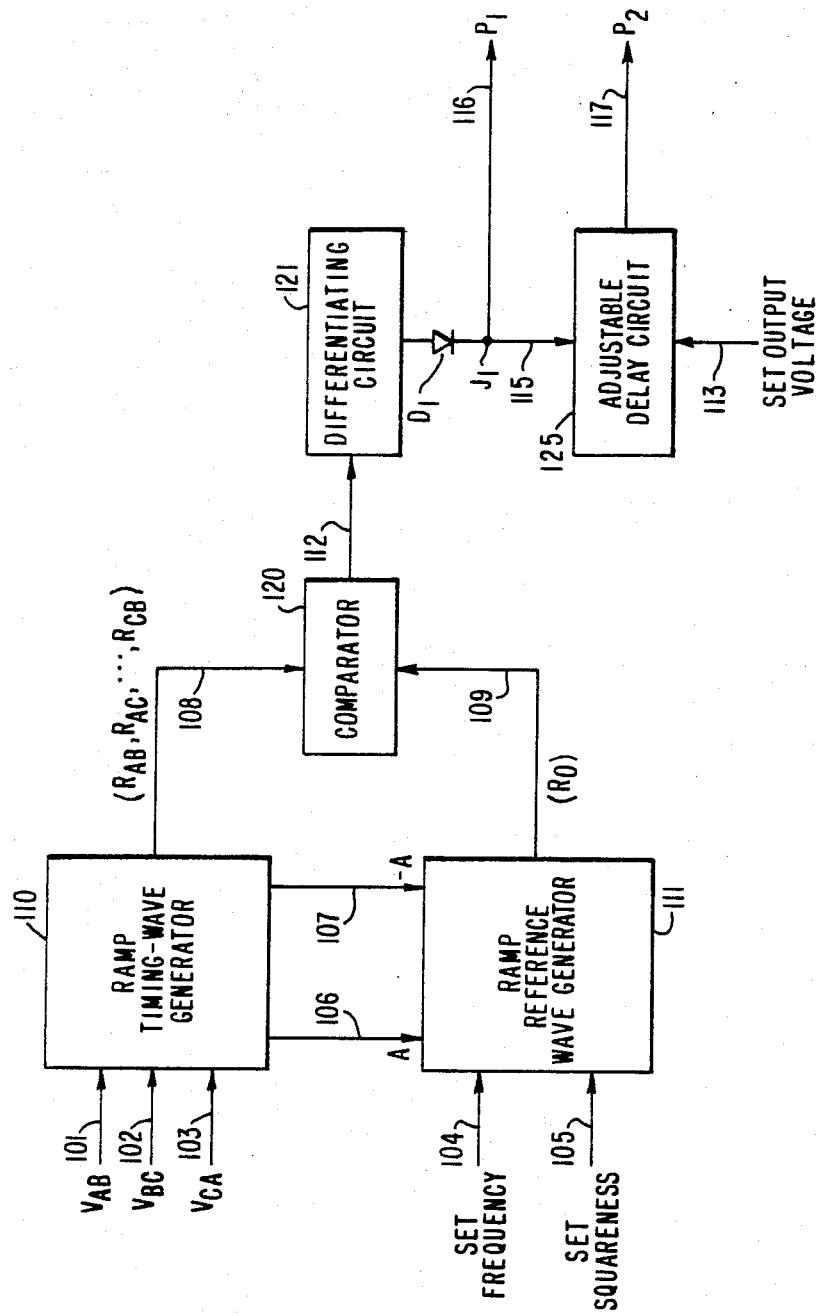
FIG. 11 is a block diagram of the control system according to the preferred embodiment of the invention.

A possible implementation of the proposed control system is illustrated by the schematic block diagram shown in FIG. 11. As seen, a set of ramp timing waves, $R_{AB}$, $R_{AC}$, $R_{BC}$, $R_{BA}$, $R_{CA}$, $R_{CB}$, are derived on line 108 from generator 110 supplied with three input supply voltages $V_{AB}$, $V_{AC}$, $V_{CA}$, (lines 101, 102, 103). The ramps are compared to the frequency reference ramp $R_0$ derived on line 109 from a frequency reference ramp generator 111. Ramp $R_0$ has a variable frequency and magnitude. The frequency reference ramp $R_0$ of line 109 is compared to the timing ramps by comparator 120 so as to generate, an output signal on line 112 upon the critical event of two instantaneous ramps outputted on lines 108 and 109 intersecting each other. This event is detected on line 112, the signal is passed through a differentiating circuit 121. From the support on line 114, via a rectifying diode $D_1$, the signal is carried over as a pulse train $P_1$, which, as known from the aforementioned U.S. patents, controls the output frequency of the UFC. A second pulse train $P_2$, controls the output voltage of the UFC which is derived on line 117 from an adjustable delay circuit 125 responsive to the pulse train $P_1$ from line 115. This is also as disclosed in the aforementioned U.S. patents.

Figure 12:
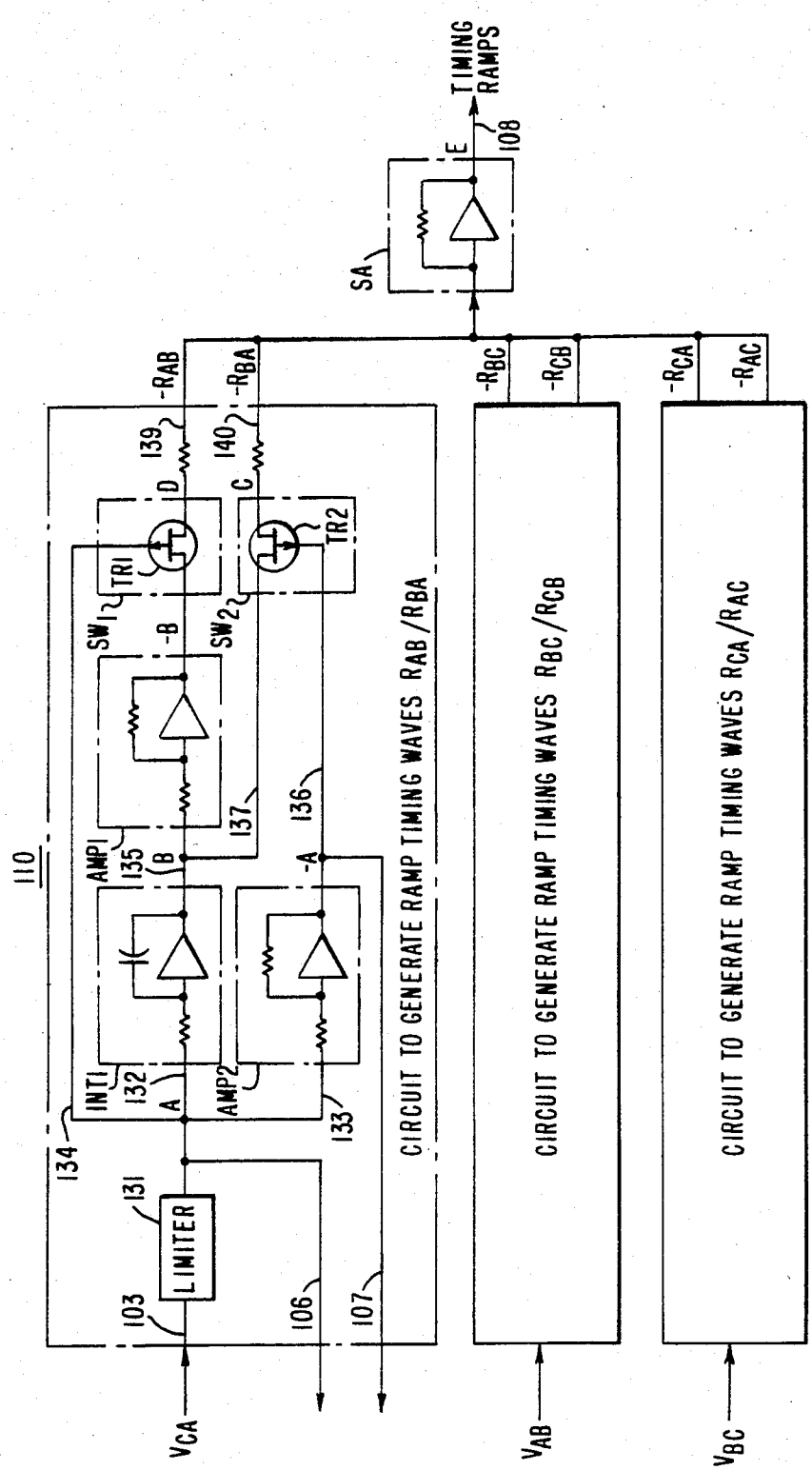
FIG. 12 is illustrative of a ramp timing wave generator as can be used in the control system of FIG. 11.
Figure 13:
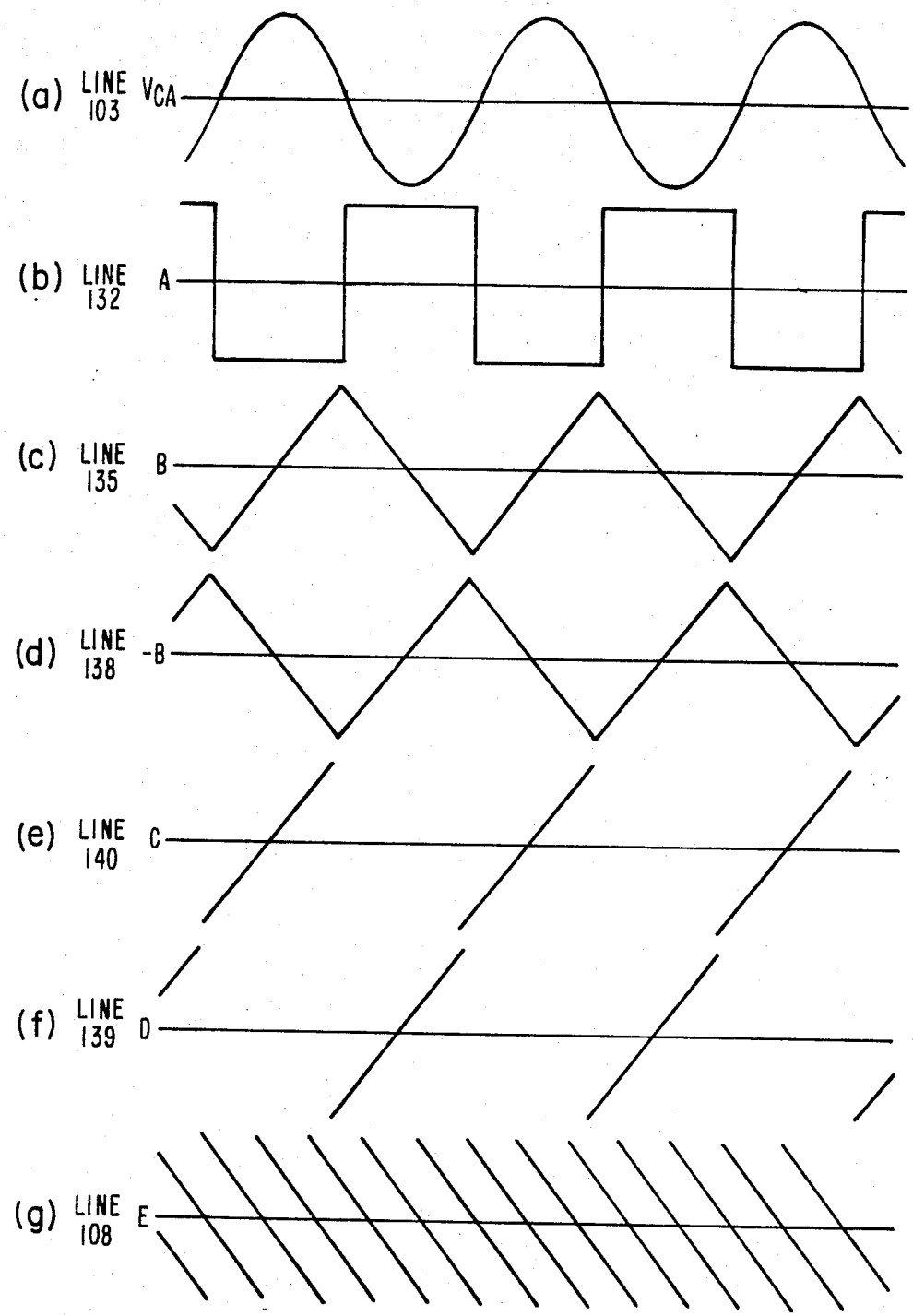
FIG. 13 is a chart of curves illustrating the operation of the generator of FIG. 12.

FIG. 12 shows a possible realization of the ramp timing wave generator 110. Its operation is illustrated by curves (a) through (g) of FIG. 13.

FIG. 12 shows the circuit for the generation of ramp timing waves ($R_{AB}$, $R_{BA}$ for opposite polarities) on lines 139, 140, respectively. Derived on line 103, the phase voltage $V_{CA}$ (curve (a) of FIG. 13) is changed by limiter 131 into a square wave illustrated by curve (b) of FIG. 13. From line 132, unity gain amplifier AMP2 provides on line 136 the opposite polarity voltage. Integrator INT1 generates from line 132 onto line 135 the sawtooth signal of curve (c), which also appears on line 137, while unity gain amplifier AMP1 provides at its output on line 138 the opposite polarity voltage illustrated by curve (d) of FIG. 13. Analog switches SW$_1$, SW$_2$ select one polarity of the signals incoming on lines 138 and 137, respectively, owing to the control signal from line 132 by line 134 onto SW$_1$ for one polarity, and the control signal from line 136 and AMP2 onto SW$_2$ for the other polarity. Accordingly, curve (c) is outputted on line 140 from SW$_2$, whereas curve (d) is outputted on line 139 from SW$_1$, the intended ramps $-R_{BA}$ and $-R_{AB}$, respectively.

The same can be said for the generation of ramps $-R_{BC}$ and $-R_{CB}$ in relation to $V_{AB}$, and for the generation of $-R_{CA}$ and $-R_{AC}$ in relation to $V_{BC}$. All the ramps are inputted into a summing amplifier SA to generate on line 108 the succession of ramps $R_{BC}$, $R_{BA}$, $R_{CA}$ ... illustrated by curves (g) in FIG. 13.

Figure 14:
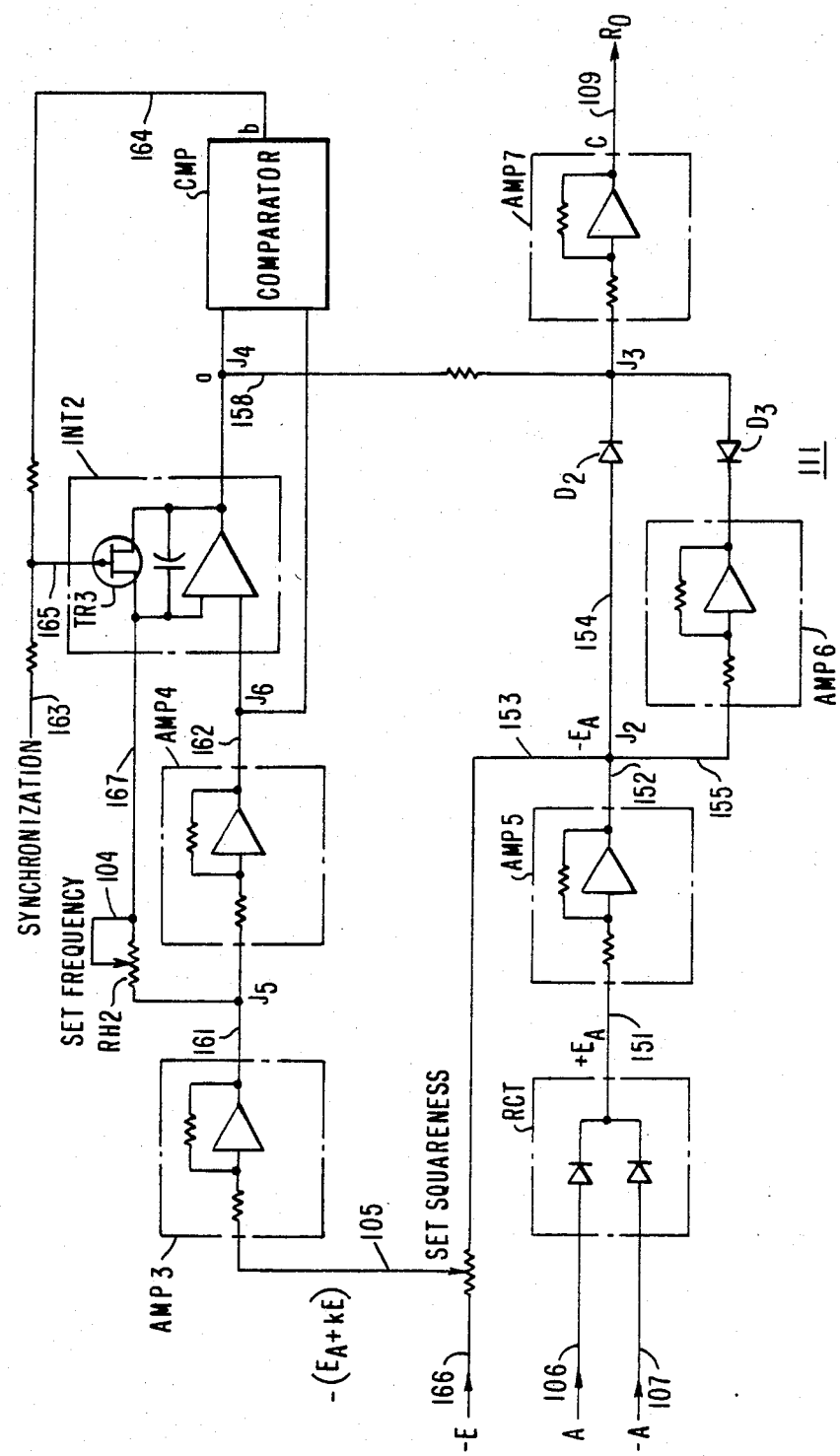
FIG. 14 is illustrative of a frequency reference ramp generator as can be used in the control system of FIG. 11.

From line 132 and from line 136 are derived via lines 106 and 107, respectively, voltage $+A$ and $-A$ supplied to the ramp reference wave generator (FIGS. 11 and 14).

FIG. 14 shows in detail a possible realization of the frequency reference wave generator 111. The generator can operate either in the sinusoidal mode (like in FIG. 8A) or in the trapezoid-like mode (as in FIG. 8B).

Lines 106 and 107 are connected to the input of a rectifier RCT, thus providing for both polarities a voltage $+E_A$ on line 151. The voltage signal is inputted into a unity gain amplifier AMP5 providing at its output (line 152, and junction $J_2$) the signal $-E_A$. To the voltage $-E_A$ is added the voltage $-E$ from line 166 and a rheostat RH$_1$ interposed between line 153 from junction $J_2$ so that line 166 provides on line 105 a selectable voltage $-(E_A+kE)$, where k can be varied between zero (sinusoidal mode) and any value up to $k=1$ (trapezoid-like mode). From line 105, signal $-(E_A+kE)$ is fed through an inverting amplifier AMP3 providing on line 161 the opposite polarity.

Line 161 goes into another inverting amplifier AMP4 onto line 162, while from line 161, via rheostat RH$_2$, the signal goes to line 167. An integrator INT2 responding to either line 162 or line 167 (depending upon the instant polarity) provides at the output (junction $J_7$) a ramp signal like curve (a) if k=0 (sinusoidal mode) or like curve (d) if $0 < k < 1$ (trapezoid-like mode). The reset input of the integrator responds on line 164 to the change of polarity from comparator CMP which compares the signal of junction $J_6$ and junction $J_4$, thereby maintaining the required peak value $\pm E_A$ of curve (a), or $\pm(E_A+kE)$ of curves (d). The squareness is regulated with rheostat RH$_1$, and the frequency of the ramp is set by rheostat RH$_2$.

From junction $J_2$, for one polarity, the clamping voltage $-E_A$ is applied by line 154 to clamping diode $D_2$, whereas, for the other polarity (through unity gain amplifier AMP6) by lines 155 and 156, the clamping voltage $+E_A$ is applied to clamping diode $D_3$. As a result, whenever the voltage at junction $J_4$ which is applied by line 158 to junction $J_3$ at the opposite side of the clamping diodes $D_2$, $D_3$, tends to exceed $E_A$, as shown with curves (d) of FIG. 15, the ramp is clamped to the level $E_A$ as shown by curves (f). This is the voltage used for intersecting the timing waves. Thus, from junction $J_3$ the truncated ramps are fed into unity gain amplifier AMP7 and outputted on line 109 (FIG. 11) for the generation of the pulse train $P_1$ of FIGS. 8A, 8B. Changing the value of k, and changing the frequency will permit control in the trapezoid-like mode as shown by FIGS. 9 and 10.

It appears that for an output voltage waveform with sinusoidal envelope, the magnitudes of the reference ramp and that of the timing ramps are kept approximately equal. This is achieved by deriving the reference ramp from a dc voltage $E_A$, which is equal to the peak value of the ramp timing waves ("squareness" setting is zero). For output voltage waveforms with trapezoid-like envelope, the controllable dc voltage kE, ($0 \leq k \leq 1$) is added to voltage $E_A$, thereby increasing the magnitude of the generator ramp above that of the timing ramps. In order to get intersection with the timing ramps, the magnitude of the actual reference ramp is clamped by the two diodes $D_2$, $D_3$ to voltage levels, $E_A$ and $-E_A$.

It should be noted that to generate a set of three identical output voltage waveforms with trapezoid-like envelope by a three phase UFC, three frequency reference ramps $R_0$, phase shifted by 120 electrical degrees are needed. These reference ramps are then compared to a common set of ramp timing waves when generating the required $P_1$ pulse train for each of the three UFC power circuits, each supplying one of the three phases of the motor. The three frequency reference ramps can be derived by three identical circuits, of the type shown in FIG. 14. However, the three circuits must be synchronized to each other to obtain the desired 120° relative phase displacement. This is achieved by providing appropriate gating signals by lines such as 163 to the "synchronism" input of the resettable integrators (INT2) to start up the three ramp generating circuits with the desired sequence and phase delays.

I claim:

1. In an unrestricted frequency changer (UFC) operable in a sinusoidal mode for converting a sinusoidal polyphase input AC power supply of predetermined input frequency into a sinusoidal polyphase output AC power supply of controllable output frequency, including a pulse generator operative in said sinusoidal mode for generating control pulses at a selectable rate for determining said output frequency; the combination of:

said pulse generator including first means for generating a plurality of timing ramps representative of electrical angles on the individual phase voltages of said sinusoidal AC input power supply and second means for generating a frequency reference ramp of selectable slope, said reference ramp intersecting said timing ramps successively to provide said control pulses at a rate depending upon said selectable slope;

with said timing ramps and said reference ramp having the same predetermined peak voltage when the UFC is in said sinusoidal mode; and with said reference ramp having a controllable peak voltage exceeding said predetermined peak voltage, whereby the UFC is operative in a mode for which said polyphase output AC power supply is trapezoid-shaped.

2. The UFC of claim 1 with the peak voltage of said reference ramp being increased beyond said predetermined peak voltage upon said output AC power supply reaching a predetermined frequency.

3. The UFC of claim 2 with the slope of said reference lamp being varied in the sinusoidal mode, and being varied in the trapezoid-shape mode.

4. The UFC of claim 3 with the provision of clamping means operative upon said reference ramp exceeding said predetermined peak voltage, whereby said control pulses are generated at a rate determined by the occurrence of the successive natural commutation points of said input phase voltages, when said reference wave exceeds said predetermined peak voltage, thereby to maintain maximum voltage for said output AC power supply.

5. The UFC of claim 4 with said reference ramp being adjusted in frequency and peak.

6. An unrestricted frequency changer (UFC) controlled by a train of control pulses having a rate selectable in relation to frequency, said rate being increased beyond a predetermined operating frequency of the UFC during selected initial and final portions of a half cycle of the output AC power supply of the UFC, and said rate being at the natural commutation rate of the input AC power supply of the UFC during the intermediate portion thereof, whereby at higher operating frequency the UFC delivers a trapezoid-like waveform.

* * * * *